(12) United States Patent
Guerin et al.

(10) Patent No.: US 7,595,361 B2
(45) Date of Patent: Sep. 29, 2009

(54) ADHESIVE COMPOSITIONS

(75) Inventors: Frederic Guerin, Petrolia (CA); Sharon X. Guo, Stratford (CA)

(73) Assignee: Lanxess Inc., Sarnia, Ontario (CA)

( * ) Notice: Subject to any disclaimer, the term of this patent is extended or adjusted under 35 U.S.C. 154(b) by 225 days.

(21) Appl. No.: 10/726,379

(22) Filed: Dec. 3, 2003

(65) Prior Publication Data

US 2004/0132906 A1 Jul. 8, 2004

(30) Foreign Application Priority Data

Dec. 5, 2002 (CA) .................... 2413636

(51) Int. Cl.
*C08L 51/08* (2006.01)
*C08G 63/91* (2006.01)
*C08F 20/50* (2006.01)
*B32B 27/00* (2006.01)

(52) U.S. Cl. .................. 525/63; 525/329.1; 525/329.7; 525/331.9; 428/355 N; 428/424.7

(58) Field of Classification Search .......... 428/355 CN, 428/355 AC, 520, 522, 41.5
See application file for complete search history.

(56) References Cited

U.S. PATENT DOCUMENTS

| | | | | | |
|---|---|---|---|---|---|
| 2,656,292 | A | * | 10/1953 | Hoover | 442/65 |
| 2,714,562 | A | * | 8/1955 | Hechtman | 428/462 |
| 2,848,355 | A | * | 8/1958 | Bartell | 428/354 |
| 3,364,155 | A | * | 1/1968 | Souffie | 525/237 |
| 3,600,268 | A | * | 8/1971 | Hori et al. | 428/215 |
| 4,379,806 | A | * | 4/1983 | Korpman | 428/354 |
| 4,988,548 | A | * | 1/1991 | Takemura et al. | 428/36.8 |
| 5,272,202 | A | * | 12/1993 | Kubo et al. | 524/565 |
| 5,346,957 | A | * | 9/1994 | Tsuji et al. | 525/122 |
| 5,683,819 | A | * | 11/1997 | Mori et al. | 428/500 |
| 5,703,189 | A | * | 12/1997 | Tsuji et al. | 526/338 |
| 5,859,155 | A | * | 1/1999 | Furihata et al. | 525/531 |
| 6,268,417 | B1 | * | 7/2001 | Ozawa et al. | 524/100 |
| 6,403,727 | B1 | * | 6/2002 | Leube et al. | 525/338 |
| 6,780,939 | B2 | * | 8/2004 | Guerin et al. | 525/329.1 |
| 7,105,606 | B2 | * | 9/2006 | Ong et al. | 525/232 |
| 2003/0152790 | A1 | * | 8/2003 | Halladay et al. | 428/500 |
| 2003/0171500 | A1 | * | 9/2003 | Guo et al. | 525/329.1 |
| 2004/0113320 | A1 | * | 6/2004 | Guerin | 264/328.2 |

FOREIGN PATENT DOCUMENTS

| | | |
|---|---|---|
| CA | 2 350 280 | 12/2002 |
| CA | 2 351 961 | 12/2002 |
| CA | 2 357 465 | 3/2003 |
| CA | 2 357 470 | 3/2003 |
| EP | 553442 A1 * | 8/1993 |

* cited by examiner

*Primary Examiner*—James Seidleck
*Assistant Examiner*—John J Figueroa
(74) *Attorney, Agent, or Firm*—Jennifer R. Seng

(57) ABSTRACT

The present invention relates to adhesive polymer composites containing at least one nitrile rubber polymer having a Mooney viscosity (ML 1+4 @ 100° C.) below 30, optionally at least one filler and optionally at least one cross-linking agent, a process for preparing the polymer composite wherein at least one nitrile rubber polymer having a Mooney viscosity (ML 1+4 @ 100° C.) below 30, optionally at least one filler and optionally at least one cross-linking agent are mixed and a self-supporting shaped article containing the compound optionally layered on or interposed between one or more supporting means. The present invention also relates to a tape containing the adhesive polymer composite optionally layered on or interposed between one or more supporting means. Further, the present invention relates to a sealant composition containing the adhesive polymer composite.

7 Claims, No Drawings

ADHESIVE COMPOSITIONS

FIELD OF THE INVENTION

The present invention relates to adhesive polymer composites containing at least one nitrile rubber polymer, that is optionally hydrogenated, having a Mooney viscosity (ML 1+4 @ 100° C.) below 30, optionally at least one filler and optionally at least one cross-linking agent, a process for preparing said polymer composite wherein at least one nitrile rubber polymer having a Mooney viscosity (ML 1+4 @ 100° C.) below 30, optionally at least one filler and optionally at least one cross-linking agent are mixed and a self-supporting shaped article containing said compound optionally layered on or interposed between one or more supporting means. The present invention also relates to a tape containing theadhesive polymer composite optionally layered on or interposed between one or more supporting means. Additionally, the present invention relates to a sealant composition comprising said adhesive polymer composite.

BACKGROUND OF THE INVENTION

Hydrogenated nitrile rubber (HNBR), prepared by the selective hydrogenation of acrylonitrile-butadiene rubber (nitrile rubber; NBR, a co-polymer containing at least one conjugated diene, at least one unsaturated nitrile and optionally further comonomers), is a specialty rubber which has very good heat resistance, excellent ozone and chemical resistance, and excellent oil resistance. Coupled with the high level of mechanical properties of the rubber (high resistance to abrasion) it is not surprising that NBR and HNBR have found widespread use in the automotive (seals, hoses, bearing pads) oil (stators, well head seals, valve plates), electrical (cable sheathing), mechanical engineering (wheels, rollers) and shipbuilding (pipe seals, couplings) industries, amongst others.

Commercially available HNBR has a Mooney viscosity in the range of from 55 to 105, a molecular weight in the range of from 200,000 to 500,000 g/mol, a polydispersity greater than 3.0 and a residual double bond (RDB) content in the range of from 1 to 18% (by IR spectroscopy).

One limitation in processing HNBR is the relatively high Mooney Viscosity. In principle, HNBR having a lower molecular weight and lower Mooney viscosity would have better processability. Attempts have been made to reduce the molecular weight of the polymer by mastication (mechanical breakdown) and by chemical means (for example, using strong acid), but such methods have the disadvantages that they result in the introduction of functional groups (such as carboxylic acid and ester groups) into the polymer, and the altering of the microstructure of the polymer. This results in disadvantageous changes in the properties of the polymer. In addition, these types of approaches, by their very nature, produce polymers having a broad molecular weight distribution.

A hydrogenated nitrile rubber having a low Mooney (<55) and improved processability, but which has the same microstructure as those rubbers which are currently available, is difficult to manufacture using current technologies. The hydrogenation of NBR to produce HNBR results in an increase in the Mooney viscosity of the raw polymer. This Mooney Increase Ratio (MIR) is generally around 2, depending upon the polymer grade, hydrogenation level and nature of the feedstock. Furthermore, limitations associated with the production of NBR itself dictate the low viscosity range for the HNBR feedstock. Currently, one of the lowest Mooney viscosity products available is Therban® VP KA 8837 (available from Bayer), which has a Mooney viscosity of 55 (ML 1+4 @ 100° C.) and a RDB of 18%.

Co-pending applications CA-2,351,961, CA-2,357,470, CA 2,350,280 and CA 2,357,465 disclose a low-Mooney NBR and HNBR and a method for producing said low-Mooney NBR and HNBR. Adhesives (glues) are substances capable of forming and maintaining a bond between two surfaces, and sealants (caulks) are substances used to fill gaps or joints between two materials to prevent the passage of liquids, solids or gases. These two classes of materials are often considered together because quite frequently a given formulation performs the both functions.

Sealants are available as one-component solvent evaporation curing products and as thermoplastic hot melts. There is no curing process; the compound gets its functionality through solvent loss and/or a decrease in temperature. When a sealant is applied, the solvent evaporates or migrates into porous substrates and the tough, rubbery compound is left in place. This is in contrast to other sealant types that cure chemically.

SUMMARY OF THE INVENTION

The present invention relates to adhesive polymer composites containing at least one, optionally hydrogenated, nitrile rubber polymer having a Mooney viscosity (ML 1+4 @ 100° C.) below 30, optionally at least one filler and optionally at least one cross-linking agent. It is preferred that the NBR is fully or partially hydrogenated ("HNBR"). The present invention also relates to polymer composites containing at least one, optionally hydrogenated, nitrile rubber polymer having a Mooney viscosity (ML 1+4 @ 100° C.) below 20, preferably below 10.

Further, the present invention relates to a process for preparing the polymer composite wherein at least one nitrile rubber polymer having a Mooney viscosity (ML 1+4 @ 100° C.) below 30, optionally at least one filler and optionally at least one cross-linking agent are mixed.

The present invention relates to a self-supporting shaped article containing the compound optionally layered on or interposed between one or more supporting means.

Additionally, the present invention relates to a tape containing the adhesive polymer composite optionally layered on or interposed between one or more supporting means.

Also, the present invention relates to a sealant composition containing the adhesive polymer composite.

DESCRIPTION OF THE INVENTION

As used throughout this specification, the term "nitrile polymer" or NBR is intended to have a broad meaning and is meant to encompass a copolymer having repeating units derived from at least one conjugated diene, at least one alpha-beta-unsaturated nitrile and optionally further one or more copolymerizable monomers.

The conjugated diene may be any known conjugated diene, such as a $C_4$-$C_6$ conjugated diene. Preferred conjugated dienes include butadiene, isoprene, piperylene, 2,3-dimethyl butadiene and mixtures thereof. More preferred $C_4$-$C_6$ conjugated dienes include butadiene, isoprene and mixtures thereof. The most preferred $C_4$-$C_6$ conjugated diene is butadiene.

The alpha-beta-unsaturated nitrile may be any known alpha-beta-unsaturated nitrile, such as a $C_3$-$C_5$ alpha-beta-unsaturated nitrile. Preferred $C_3$-$C_5$ alpha-beta-unsaturated nitrites include acrylonitrile, methacrylonitrile, ethacrylonitrile and mixtures thereof. The most preferred $C_3$-$C_5$ alpha-beta-unsaturated nitrile is acrylonitrile.

Preferably, the copolymer contains in the range of from 40 to 85 weight percent of repeating units derived from one or more conjugated dienes and in the range of from 15 to 60 weight percent of repeating units derived from one or more unsaturated nitrites. More preferably, the copolymer contains in the range of from 60 to 75 weight percent of repeating units derived from one or more conjugated dienes and in the range of from 25 to 40 weight percent of repeating units derived from one or more unsaturated nitrites. Most preferably, the copolymer contains in the range of from 60 to 70 weight percent of repeating units derived from one or more conjugated dienes and in the range of from 30 to 40 weight percent of repeating units derived from one or more unsaturated nitrites.

Optionally, the copolymer may further contain repeating units derived from one or more copolymerizable monomers, such as unsaturated carboxylic acids. Non-limiting examples of suitable unsaturated carboxylic acids include fumaric acid, maleic acid, acrylic acid, methacrylic acid and mixtures thereof. Repeating units derived from one or more copolymerizable monomers will replace either the nitrile or the diene portion of the nitrile rubber and it will be apparent to the skilled in the art that the above mentioned figures will have to be adjusted to result in 100 weight percent. In case of the mentioned unsaturated carboxylic acids, the nitrile rubber preferably contains repeating units derived from one or more unsaturated carboxylic acids in the range of from 1 to 10 weight percent of the rubber, with this amount displacing a corresponding amount of the conjugated diolefin.

Other preferred optionally further monomers include unsaturated mono- or di-carboxylic acids or derivatives thereof (e.g., esters, amides and the like) including mixtures thereof.

Hydrogenated in the present invention is preferably understood by more than 50% of the residual double bonds (RDB) present in the starting nitrile polymer/NBR being hydrogenated, preferably more than 90% of the RDB are hydrogenated, more preferably more than 95% of the RDB are hydrogenated and most preferably more than 99% of the RDB are hydrogenated.

The Mooney viscosity of the rubber was determined using ASTM test D1646.

The inventive polymer composite contains at least one, optionally hydrogenated, NBR having a Mooney viscosity (ML 1+4 @ 100° C. according to ASTM test D1646) of less than 30, or, for example less than 20, preferably less than 15 and more preferably less than 10.

It is preferred that the low-Mooney, optionally hydrogenated NBR of the present invention has a polydispersity index of less than 3, or less than 2.9, or, for example less than 2.8, or, further for example less than 2.7, preferably less than 2.6, more preferably less than 2.5, even more preferably less than 2.4, and even more preferably less than 2.3, and most preferably less than 2.2.

The present invention is not restricted to a special process for preparing the optionally hydrogenated NBR. However, the NBR/HNBR of the present invention is readily available in a two step synthesis as disclosed in CA-2,351,961, CA-2,357,470, CA 2,350,280 and CA 2,357,465, which may take place in the same reaction set-up or different reactors. For jurisdictions allowing for this procedure, CA-2,351,961, CA-2,357,470, CA 2,350,280 and CA 2,357,465 are incorporated herein by reference.

Step 1: Metathesis

The metathesis reaction is conducted in the presence of one or more compounds of the general formulas I, II, III or IV;

Formula I

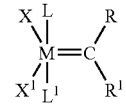

wherein:
M is Os or Ru,
R and $R^1$ are, independently, hydrogen or a hydrocarbon selected from the group consisting of $C_2$-$C_{20}$ alkenyl, $C_2$-$C_{20}$ alkynyl, $C_1$-$C_{20}$ alkyl, aryl, $C_1$-$C_{20}$ carboxylate, $C_1$-$C_{20}$ alkoxy, $C_2$-$C_{20}$ alkenyloxy, $C_2$-$C_{20}$ alkynyloxy, aryloxy, $C_2$-$C_{20}$ alkoxycarbonyl, $C_1$-$C_{20}$ alkylthio, $C_1$-$C_{20}$ alkylsulfonyl and $C_1$-$C_{20}$ alkylsulfinyl,
X and $X^1$ are independently any anionic ligand, and
L and $L^1$ are independently any neutral ligand, such as phosphines, amines, thioethers or imidazolidinylidenes or any neutral carbene, optionally, L and $L^1$ can be linked to one another to from a bidentate neutral ligand;

Formula II

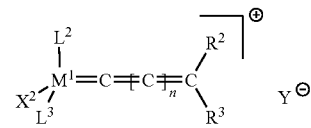

wherein:
$M^1$ is Os or Ru;
$R^2$ and $R^3$ are, independently, hydrogen or a hydrocarbon selected from the group consisting of $C_2$-$C_{20}$ alkenyl, $C_2$-$C_{20}$ alkynyl, $C_1$-$C_{20}$ alkyl, aryl, $C_1$-$C_{20}$ carboxylate, $C_1$-$C_{20}$ alkoxy, $C_2$-$C_{20}$ alkenyloxy, $C_2$-$C_{20}$ alkynyloxy, aryloxy, $C_2$-$C_{20}$ alkoxycarbonyl, $C_1$-$C_{20}$ alkylthio, $C_1$-$C_{20}$ alkylsulfonyl and $C_1$-$C_{20}$ alkylsulfinyl,
$X^2$ is a anionic ligand, and
$L^2$ is a neutral π-bonded ligand, independent of whether they are mono- or polycyclic,
$L^3$ is a ligand selected from the group consisting of phosphines, sulfonated phosphines, fluorinated phosphines, functionalized phosphines bearing up to three aminoalkyl-, ammoniumalkyl-, alkoxyalkyl-, alkoxyl-carbonylalkyl-, hydroxycarbonylalkyl-, hydroxyalkyl- or ketoalkyl- groups, phosphites, phosphinites, phosphonites, phosphinamines, arsines, stibenes, ethers, amines, amides, imines, sulfoxides, thioethers and pyridines,
$Y^-$ is a non-coordinating anion,
n is an integer in the range of from 0 to 5;

Formula III

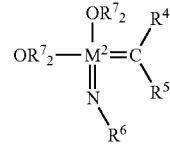

wherein
$M^2$ is Mo or W,
$R^4$ and $R^5$ are, independently, hydrogen or a hydrocarbon selected from the group consisting of $C_2$-$C_{20}$ alkenyl, $C_2$-$C_{20}$ alkynyl, $C_1$-$C_{20}$ alkyl, aryl, $C_1$-$C_{20}$ carboxylate, $C_1$-$C_{20}$ alkoxy, $C_2$-$C_{20}$ alkenyloxy, $C_2$-$C_{20}$ alkynyloxy, aryloxy, $C_2$-$C_{20}$ alkoxycarbonyl, $C_1$-$C_{20}$ alkylthio, $C_1$-$C_{20}$ alkylsulfonyl and $C_1$-$C_{20}$ alkylsulfinyl, $R^6$ and $R^7$ are independently selected from any unsubstituted or halo-substituted alkyl, aryl, aralkyl groups or silicon-containing analogs thereof,

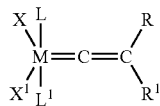

Formula IV wherein:
M is Os or Ru,
R and $R^1$ are independently selected from the group consisting of hydrogen, substituted or unsubstituted alkyl, and substituted or unsubstituted alkyl,
X and $X^1$ are independently any anionic ligand, and
L and $L^1$ are independently any neutral ligand, such as phosphines, amines, thioethers or imidazolidinylidenes or any neutral carbene, optionally, L and $L^1$ can be linked to one another to from a bidentate neutral ligand;

Compounds of Formula I are preferred. Compounds of Formula I wherein L and $L^1$ are trialkylphosphines, X and $X^1$ are chloride ions and M is Ruthenium are more preferred.

The amount of compounds will depend upon the nature and catalytic activity of the compound(s) in question. Typically, the ratio of compound(s) to NBR is in the range of from 0.005 to 5, preferably in the range of from 0.025 to 1 and, more preferably, in the range of from 0.1 to 0.5.

The metathesis reaction is carried out in the presence of a co-olefin which is preferably a $C_2$ to $C_{16}$ linear or branched olefin such as ethylene, isobutene, styrene or 1-hexene. Where the co-olefin is a liquid (such as 1-hexene), the amount of co-olefin employed is preferably in the range of from 1 to 200 weight %. Where the co-olefin is a gas (such as ethylene) the amount of co-olefin employed is such that it results in a pressure in the reaction vessel in the range of from $1*10^5$ Pa to $1*10^7$ Pa, preferably in the range of from $5.2*10^5$ Pa to $4*10^6$ Pa.

The metathesis reaction can be carried out in any suitable solvent which does not inactivate the catalyst or otherwise interfere with the reaction. Preferred solvents include, but are not limited to, dichloromethane, benzene, toluene, tetrahydrofuran, cylcohexane and the like. The most preferred solvent is monochlorobenzene (MCB). In certain cases the co-olefin can itself act as a solvent (for example, 1-hexene), in which case no other solvent is necessary.

The concentration of nitrile polymer (NBR) in the reaction mixture is not critical but, obviously, should be such that the reaction is not hampered if the mixture is too viscous to be stirred efficiently, for example. Preferably, the concentration of NBR is in the range of from 1 to 20% by weight, more preferably in the range of from 6 to 15% by weight.

The metathesis reaction is carried out at a temperature in the range of from 20 to 140° C.; preferably in the range of from 60 to 120° C.

The reaction time will depend upon a number of factors, including cement concentration, amount of catalyst used and the temperature at which the reaction is performed. The metathesis is usually complete within the first two hours under typical conditions. The progress of the metathesis reaction may be monitored by standard analytical techniques, for example using GPC or solution viscosity. Whenever referenced throughout the specification the molecular weight distribution of the polymer was determined by gel permeation chromatography (GPC) using a Waters 2690 Separation Module and a Waters 410 Differential Refractometer running Waters Millenium software version 3.05.01. Samples were dissolved in tetrahydrofuran (THF) stabilized with 0.025% BHT. The columns used for the determination were three sequential mixed-B gel columns from Polymer Labs. Reference Standards used were polystyrene standards from American Polymer Standards Corp.

Step 2: Hydrogenation

After the metathesis reaction, the nitrile polymer can be hydrogenated to result in a partially or fully hydrogenated nitrile polymer (HNBR). HNBR are preferred in the present invention. Reduction of the product from the metathesis reaction can be effected using standard reduction techniques known in the art. For example, homogeneous hydrogenation catalysts known to those of skill in the art, such as Wilkinson's catalyst $\{(PPh_3)_3RhCl\}$ and the like can be used.

The hydrogenation may be performed in situ i.e. in the same reaction vessel in which the metathesis step is carried out, without the need to first isolate the metathesised product. The hydrogenation catalyst is simply added to the vessel, which is then treated with hydrogen to produce the HNBR.

Grubb's catalyst, in the presence of hydrogen, is converted to a dihydride complex $(PR_3)_2RuCl_2H_2$, which is itself an olefin hydrogenation catalyst. Thus, in a favorable one-pot reaction, Grubb's catalyst was used to reduce the molecular weight of NBR in the presence of co-olefin. The reaction mixture was then treated with hydrogen, converting the Grubb's complex to the dihydride species which then hydrogenated the metathesis product to produce the HNBR of the invention. The rate of hydrogenation was lower in this case than in the case where Wilkinson's catalyst was used for the hydrogenation step, but it is clear that such an approach is indeed a viable one.

The low Mooney NBR as well as the low Mooney HNBR which forms a preferred component of the polymer composite of the invention can be characterized by standard techniques known in the art. For example, the molecular weight distribution of the polymer was determined by gel permeation chromatography (GPC) using a Waters 2690 Separation Module and a Waters 410 Differential Refractometer running Waters Millennium software version 3.05.01. Samples were dissolved in tetrahydrofuran (THF) stabilized with 0.025% BHT. The columns used for the determination were three sequential mixed-B gel columns from Polymer Labs. Reference Standards used were polystyrene standards from American Polymer Standards Corp.

The present inventive polymer composite further optionally contains at least one filler. The filler may be an active or an inactive filler or a mixture thereof. The filler may be:

highly dispersed silicas, prepared e.g. by the precipitation of silicate solutions or the flame hydrolysis of silicon halides, with specific surface areas of in the range of from 5 to 1000 m²/g, and with primary particle sizes of in the range of from 10 to 400 nm; the silicas can optionally also be present as mixed oxides with other metal oxides such as those of Al, Mg, Ca, Ba, Zn, Zr and Ti;

synthetic silicates, such as aluminum silicate and alkaline earth metal silicate like magnesium silicate or calcium silicate, with BET specific surface areas in the range of from 20 to 400 m²/g and primary particle diameters in the range of from 10 to 400 nm;

natural silicates, such as kaolin and other naturally occurring silica;

glass fibers and glass fiber products (matting, extrudates) or glass microspheres;

metal oxides, such as zinc oxide, calcium oxide, magnesium oxide and aluminum oxide;

metal carbonates, such as magnesium carbonate, calcium carbonate and zinc carbonate;

metal hydroxides, e.g. aluminum hydroxide and magnesium hydroxide;

carbon blacks; the carbon blacks to be used here are prepared by the lamp black, furnace black or gas black process and have preferably BET (DIN 66 131) specific surface areas in the range of from 20 to 200 m$^2$/g, e.g. SAF, ISAF, HAF, FEF or GPF carbon blacks;

rubber gels, such as those based on polybutadiene, butadiene/styrene copolymers, butadiene/acrylonitrile copolymers and polychloroprene;

or mixtures thereof.

Examples of preferred mineral fillers include silica, silicates, clay such as bentonite, gypsum, alumina, titanium dioxide, talc, mixtures of these, and the like. These mineral particles have hydroxyl groups on their surface, rendering them hydrophilic and oleophobic. This exacerbates the difficulty of achieving good interaction between the filler particles and the rubber. For many purposes, the preferred mineral is silica, especially silica made by carbon dioxide precipitation of sodium silicate. Dried amorphous silica particles suitable for use in accordance with the present invention may have a mean agglomerate particle size in the range of from 1 to 100 microns, preferably between 10 and 50 microns and more preferably between 10 and 25 microns. It is preferred that less than 10 percent by volume of the agglomerate particles are below 5 microns or over 50 microns in size. A suitable amorphous dried silica moreover usually has a BET surface area, measured in accordance with DIN (Deutsche Industrie Norm) 66131, of in the range of from 50 and 450 square meters per gram and a DBP absorption, as measured in accordance with DIN 53601, of in the range of from 150 and 400 grams per 100 grams of silica, and a drying loss, as measured according to DIN ISO 787/11, of in the range of from 0 to 10 percent by weight. Suitable silica fillers are available under the trademarks HiSil® 210, HiSil® 233 and HiSil® 243 from PPG Industries Inc. Also suitable are Vulkasil S and Vulkasil N, from Bayer AG.

Often, use of carbon black as a filler is advantageous. Usually, carbon black is present in the polymer composite in an amount of in the range of from 20 to 200 parts by weight, preferably 30 to 150 parts by weight, more preferably 40 to 100 parts by weight. Further, it might be advantageous to use a combination of carbon black and mineral filler in the inventive polymer composite. In this combination the ratio of mineral fillers to carbon black is usually in the range of from 0.05 to 20, preferably 0.1 to 10.

The polymer composite may advantageously further contain other natural or synthetic rubbers such as BR (polybutadiene), ABR (butadiene/acrylic acid-$C_1$-$C_4$-alkylester-copolymers), CR (polychloroprene), IR (polyisoprene), SBR (styrene/butadiene-copolymers) with styrene contents in the range of 1 to 60 wt %, NBR (butadiene/acrylonitrile-copolymers with acrylonitrile contents of 5 to 60 wt %, HNBR with a Mooney viscosity (ML 1+4 @ 100° C. according to ASTM test D1646) of at least 30 (partially or totally hydrogenated NBR-rubber), EPDM (ethylene/propylene/diene-copolymers), FKM (fluoropolymers or fluororubbers), and mixtures of the given polymers. Careful blending with conventional HNBR often reduces cost of the polymer composite without sacrificing the processability. The amount of conventional HNBR and/or other natural or synthetic rubbers will depend on the process condition to be applied during manufacture of shaped articles and is readily available by few preliminary experiments.

The polymer composite furthermore optionally contains one or more cross-linking agents or curing systems. The present invention is not limited to a special curing system, however, peroxide curing system are preferred. Furthermore, the present invention is not limited to a special peroxide curing system. For example, inorganic or organic peroxides are suitable. Preferred are organic peroxides such as dialkylperoxides, ketalperoxides, aralkylperoxides, peroxide ethers, peroxide esters, such as di-tert.-butylperoxide, bis-(tert.-butylperoxyiso-propyl)-benzene, dicumylperoxide, 2,5-dimethyl-2,5-di(tert.-butylperoxy)-hexane, 2,5-dimethyl-2,5-di(tert.-butylperoxy)-hexene-(3), 1,1-bis-(tert.-butylperoxy)-3,3,5-trimethyl-cyclohexane, benzoylperoxide, tert.-butylcumylperoxide and tert.-butylperbenzoate. Usually the amount of peroxide in the polymer composite is in the range of from 1 to 10 phr (=per hundred rubber), preferably from 4 to 8 phr. Subsequent curing is usually performed at a temperature in the range of from 100 to 200° C., preferably 130 to 180° C. Peroxides might be applied advantageously in a polymer-bound form. Suitable systems are commercially available, such as Polydispersion T(VC) D-40 P from Rhein Chemie Rheinau GmbH, D (=polymerbound di-tert.-butylperoxy-isopropylbenzene).

The compound optionally further contains at least one diluent. The diluent is intended to reduce the viscosity of the compound and preferably evaporates after the compound is in its final position. The term "diluent" expressly includes solvents of the polymer component or the whole compound. The present invention is not limited to a special diluent. For example, aromatic or cyclic hydrocarbons such as toluene and cyclohexane or aliphatic hydrocarbons such as hexane are suitable. Preferred diluents for the polymer component are aliphatic and cyclic hydrocarbons. Usually the amount of diluent in the compound is in the range of from 0 to 200 phr (=per hundred rubber), preferably from 0 to 150 phr.

In cases where the compound is intended for application as a hot-melt, there is little or preferably no diluent present in the compound.

The rubber composition according to the present invention can contain further auxiliary products for rubbers, such as reaction accelerators, vulcanizing accelerators, vulcanizing acceleration auxiliaries, antioxidants, foaming agents, antiaging agents, heat stabilizers, light stabilizers, ozone stabilizers, processing aids, plasticizers, tackifiers, blowing agents, dyestuffs, pigments, waxes, extenders, organic acids, inhibitors, metal oxides, and activators such as triethanolamine, polyethylene glycol, hexanetriol, etc., which are known to the rubber industry. The rubber aids are used in conventional amounts, which depend inter alia on the intended use. Conventional amounts are e.g. from 0.1 to 50 wt. %, based on rubber. Preferably the composition contains in the range of 0.1 to 20 phr of an organic fatty acid as an auxiliary product, preferably a unsaturated fatty acid having one, two or more carbon double bonds in the molecule which more preferably includes 10% by weight or more of a conjugated diene acid having at least one conjugated carbon-carbon double bond in its molecule. Preferably those fatty acids have in the range of from 8-22 carbon atoms, more preferably 12-18. Examples include stearic acid, palmitic acid and oleic acid and their calcium-, zinc-, magnesium-, potassium- and ammonium salts. Preferably the composition contains in the range of 5 to 50 phr of an acrylate as an auxiliary product. Suitable acrylates are known from EP-A1-0319320, for example p. 3, l. 16 to 35, from U.S. Pat. No. 5,208,294, for example Col. 2, l. 25 to 40, and from US4,983,678, for example Col. 2, I. 45 to 62. Reference is made to zinc acrylate, zinc diacrylate or zinc dimethacrylate or a liquid acrylate, such as trimethylolpropanetrim-ethacrylate (TRIM), butanedioldimethacrylate (BDMA) and ethylengly-coldimethacrylate (EDMA). It might be advantageous to use a combination of different acrylates and/or metal salts thereof. Of particular advantage is often to use metal acrylates in combination with a Scorch-retarder such as sterically hindered phenols (e.g. methyl-substituted aminoalkylphenols, in particular 2,6-di-tert.-butyl-4-dimethylamino-methylphenol).

The ingredients of the final polymer composite are mixed together, suitably at an elevated temperature that may range from 25° C. to 200° C. Normally the mixing time does not exceed one hour and a time in the range from 2 to 30 minutes is usually adequate. The mixing is suitably carried out in an internal mixer such as a Banbury mixer, or a Haake or Brabender miniature internal mixer. A two roll mill mixer also provides a good dispersion of the additives within the elastomer. An extruder also provides good mixing, and permits shorter mixing times. It is possible to carry out the mixing in two or more stages, and the mixing can be done in different apparatus, for example one stage in an internal mixer and one stage in an extruder. However, it should be taken care that no unwanted pre-crosslinking (=scorch) occurs during the mixing stage. For compounding and vulcanization see also: Encyclopedia of Polymer Science and Engineering, Vol. 4, p. 66 et seq. (Compounding) and Vol. 17, p. 666 et seq. (Vulcanization).

Due to the low viscosity of the polymer composite, the polymer composite is ideally suited to be processed by but not limited to molding injection technology. The polymer composite can also be useful to transfer molding, to compression molding, to liquid injection molding. The polymer composite containing a cross-linking system is usually introduced in a conventional injection molding and injected into hot (about 160-230° C.) forms where the cross-linking/vulcanization takes place depending on the polymer composite composition and temperature of the mold.

Generally, the self-adhesive rubber composition according to the present invention does not contain tackifying agents. However, it may be advantageous for certain applications to use such tackifying agents. Petroleum resins are often used for this purpose. These resins are frequently produced by polymerization of a mixture of a distillate obtained by petroleum cracking that normally boils in the range from 25° C. to 80° C., and a monovinyl aromatic monomer with 8 to 9 carbon atoms in proportions such as to form a resin that contains 5 to 15 wt. % of the monovinyl aromatic compound measured by means of nuclear resonance analysis (NMR).

The distillate obtained from the petroleum cracking contains a mixture of saturated and unsaturated monomers, the unsaturated monomers being monoolefins and diolefins, and some higher and lower materials such as $C_6$ olefins and diolefins may be present, although the unsaturated materials are predominantly $C_5$ olefins. The distillate may also contain saturated or aromatic materials that may act as polymerization solvents.

Further tackifying resins include terpene resins as well as those resins that are formed in the polymerization of unsaturated $C_5$-$C_9$ hydrocarbon monomers. Examples of commercially available resins based on a $C_5$ olefin fraction of this type are the tackifying resins Wingtack™ 95 and 115 (Goodyear Tire and Rubber Co., Akron, Ohio). Other hydrocarbon resins include Regalrez™ 1078 and 1126 (Hercules Chemical Co. Inc., Wilmington, Del.), Arkon™ resins such as Arkon™ P115 (Arakawa Forest Chemical Industries, Chicago, Ill.) and Escorez™ resins (Exxon Chemical Co., Houston, Tex.). Suitable terpene resins include terpene polymers such as polymeric resin-containing materials that are obtained by the polymerization and/or copolymerization of terpene hydrocarbons such as alicyclic, monocyclic and bicyclic monoterpenes and their mixtures. Commercially available terpene resins include the Zonarezm terpene resins of the B Series and 7000 Series (Arizona Chemical Corp., Wayne, N.J.). The tackifying resin may be ethylenically unsaturated, although saturated tackifying resins are preferred for those applications in which resistance to oxidation is important. Also suitable are the coumarone-indene resins marketed by Rhein Chemie, Germany, under the trade name Rhenosine® (Rhenosin® types: C 10, C 30, C 90, C 100, C 110, C 120, C 150), hydrocarbon resins (Rhenosin® types: TP 100, TT 10, TT 30, TT 90, TT 100, TD 90, TD 100, TD 110), phenolic resins (Rhenosin® types: P 9447 K, P 7443 K, P 6204 K) as well as bitumen resins (Rhenosin® types: 145 and 260).

These resins are normally used in an amount in the range from 0.1 to 150 parts by weight per 100 parts of nitrile polymer.

As the present inventive adhesive composite exhibits excellent adhesive properties at elevated temperatures, such as above 80° C., more preferred above 100° C., the present invention is specifically directed towards an adhesive polymer composite containing at least one, optionally hydrogenated, nitrile rubber polymer having a Mooney viscosity (ML 1+4 @ 100° C.) below 30, optionally at least one filler and optionally at least one cross-linking agent, wherein said adhesive polymer composite exhibits to decrease in adhesive properties at temperatures in the range of from 80-150° C., preferably 100-150° C., even more preferred in the range of from 100-120° C.

Furthermore, the present invention provides a self-supporting shaped article comprising said adhesive polymer composites containing at least one, preferably hydrogenated, nitrile rubber polymer having a Mooney viscosity (ML 1+4 @ 100° C.) below 30 optionally layered on or interposed between one or more supporting means.

Self-supporting shaped articles without supporting means are 3-dimensional articles such as sheets, pellets, sticks, films or beads.

The present invention includes a tape containing the adhesive polymer composites containing at least one, preferably hydrogenated, nitrile rubber polymer having a Mooney viscosity (ML 1+4 @ 100° C.) below 30 optionally layered on or interposed between one or more supporting means.

For this application, the present inventive self-adhesive rubber composition is applied to the preferably primed surface of a suitable supporting means (i.e. substrate). As a rule the layer thickness of the rubber composition is in the range from 6 to 250 μm, in particular 10 to 100 μm. Preferred substrates include polyolefins such as LDPE, HDPE, PP, BOPP, polyurethanes, polyethylene terephthalates, PVC, ABS, polycarbonates, polyamides and polyesters.

The priming material is, for example, a neutralized hydrogenated colophony. By priming the substrate with this composition, the adhesive remains firmly adherent to the latter, even after the substrate composite has been applied to a surface. The primer composition according to the present invention produces a highly polar surface to which the self-adhesive composition can adhere.

Types of colophony that are suitable for the primer composition include polar colophony that contains acidic groups. Colophony that is at least partially hydrogenated is preferred. Commercially available colophony includes Foral™ AX hydrogenated colophony, Dresinol™ 205 colophony and Staybelite™ hydrogenated colophony (all from Hercules Chemical Co.), as well as Hypale™ colophony (Arakawa). Acid-containing colophony is highly polar and may be used in the present self-adhesive composition also as a surface-active agent and/or tackifying agent.

However, this type of colophony is used as a primer in order to improve the adherence of the rubber composition to the substrate.

In order to neutralize the acid-containing colophony, the latter is, for example, reacted with a solution of a basic compound that can form a metal salt on reaction with the colophony. Suitable bases include alkali metal hydroxides (e.g. LiOH, NaOH, KOH) and alkaline earth metal hydroxides (e.g. $Ca(OH)_2$, $Mg(OH)_2$). On account of their solubility properties, alkali metal hydroxides, in particular KOH and NaOH, are preferred. Such hydroxides may be dissolved in a polar solvent such as water.

In order to react the colophony and the basic compound, both substances are as a rule dissolved in a solvent, preferably a polar solvent (because these compounds tend to exhibit polarity), preferably water. The substances are then allowed to undergo an acid-base reaction. Since such reactions normally occur spontaneously, no special measures (for example elevated temperature or elevated pressure) are necessary, although they may be employed if desired. Normally stoichiometric amounts of colophony and base (or a slight excess of base) are used.

The neutralized colophony may optionally be mixed with an elastomeric compound before being applied to the substrate. Preferably, the elastomeric compound is highly compatible with the organic part of the colophony and with a saturating agent used in the tape substrate. Also, the elastomer is preferably dispersible in water. Since many substrates that are available contain crepe paper saturated with an acrylate polymer or with a styrene-butadiene rubber (styrene-butadiene rubber=SBR) and since acrylates and SBRs are compatible with the organic part of most types of hydrogenated colophony, they are preferred types of elastomers.

SBRs are known in the art and can be obtained from various suppliers. Common examples include Butofan™ NS209, NS222, NS 155 and NS248 rubber (BASF Corp., Parsippany, N.J. and Perbunan™ latices from Polymer Latex GmbH & Co. KG, Germany). Other suitable polymers include nitrile rubber such as the Hycar™ polymer series (B.F. Goodrich Co., Akron, Ohio) and (meth)acrylate polymers. Also suitable as elastomers are carboxylated NBR, HNBR and liquid NBR types, for example Therbane® VBKA 8889, Krynace® K.X. 7.40, K.X. 7.50, K.X. 90 and K.E. 34.38 from Bayer AG.

A mixture of a rubber-based emulsion polymer, a colophony-based surface-active agent and a colophony-based tackifying agent is described in U.S. Pat. No. 5,385,965.

Suitable rubber-based polymers include carboxylated statistical styrene-butadiene copolymers. Foral™ AX colophony compounds are included in the list of suitable tackifying resins.

If an elastomeric component together with a neutralized colophony is used in the primer, the two components may be mixed in any ratio in the range from 0.01:99.99 to 75:25, though a ratio of 50:50 (by weight) is preferred. (Other ranges are also suitable depending on the coating process that is employed.) The mixing is effected simply by adding the elastomer to the neutralized aqueous colophony mixture. The mixture can then be diluted to a desired concentration for coating. Preferred concentrations are in the range from 5 to 25 wt. %, more preferably in the range from 10 to 20 wt. %.

A preferred primer composition for a tape substrate saturated with SBR may be produced by neutralizing Foral™ AX colophony with an approximately stoichiometric amount of a strong base (for example an aqueous solution of KOH) in water at elevated temperature (e.g. 88° C.). After the neutralized colophony mixture has been removed from the heat source, it is combined with an approximately equal amount (by weight) of Butofan™ NS209 SBR and the resulting mixture is diluted in water to a solids content of about 15%. Also preferred are priming compositions with a minor amount of double bonds, such as ethylene-vinyl acetate copolymers with vinyl acetate contents below 40 wt. %, ethylene-α-olefin copolymers or ethylene-α-olefin-diene terpolymers.

The priming composition and/or the self-adhesive composition can be applied to a substrate (for example a tape substrate) by many different methods, including solvent coating, solvent spraying, emulsion coating, low pressure coating or other processes known to the person skilled in the art. Suitable substrates include polyolefin films (e.g. polyethylene and polypropylene films), in particular corona-treated polyolefin films, and paper saturated with elastomer. The suitable coating weight is in the range from 0.1 to 5 $mg/cm^2$, preferably from 0.2 to 1.0 $mg/cm^2$, and more preferably from 0.3 to 0.5 $mg/cm^2$. When the priming layer has been applied to a substrate, it is then preferably dried. This drying preferably takes place at elevated temperature, under reduced pressure, or both.

A further preferred method for the production of coated substrates is co-extrusion coating, which is normally carried out in a coating device with a melt film of the self-adhesive composition that is melted in an extruder and is applied via a flat-sheeting die to a substrate that may consist of one or more polymer layers. The composite that is thereby formed is then cooled in a cooling/press roll unit and smoothed. The composite strip material is then coiled in a corresponding coiling machine.

In the furthermore preferred lamination process the procedures of application of the coating composition to the carrier strip, smoothing and cooling, and stripping and coiling are carried out in a similar manner to the coating process. In the actual extrusion lamination, a prefabricated carrier strip is fed into a calender roll frame with 4 rollers. In this case, the carrier strip is coated before the first roller gap with a melt film that is melted in an extruder and applied via a flat-sheeting die. A second prefabricated strip is fed in before the second roller gap. The composite material that is, thereby formed, is smoothed on passing through the second roller gap, then cooled, stripped, and coiled in a coiling unit. These so-called cast films may be pretreated to improve the range of the composite bonding (carrier film/self-adhesive composition). The polyolefin carrier film is typically either subjected to a corona oxidation or is coated with a silicone layer.

According to the furthermore preferred blowing/flat-sheeting die extrusion process, the present inventive composition in dry form and various polymers are generally first of all melted in different extruders under suitable conditions and are then combined in the form of melt streams with the formation of a multilayer melt stream in the extrusion apparatus. This is followed by the discharge, stripping and cooling of the multilayer molten strip containing the self-adhesive composition and the coiling of the composite material. A composite film is obtained in this way. The flat-sheeting die extrusion process is preferably employed in this connection.

Suitable polymers for these processes include, thermoplastics such as, for example, polyamides, polystyrene, polyesters, polycarbonates or polyolefins. Polyolefins are preferably used, for example ethylene homopolymers, propylene homopolymers or statistical propylene-ethylene copolymers. The production of such polyolefins may be carried out by conventional types of polymerization known to the person skilled in the art, for example by Ziegler-Natta polymerization, by polymerization with the aid of Phillips catalysts, by high pressure polymerization or by polymerization with the aid of metallocene-containing catalysts.

The coating/extrusion processes can be carried out at temperatures in the range from 170° C. to 300° C., pressures of 250 to 400 bar, and mean transit times of 5 to 20 minutes. Since the copolymers in the melt and in the film have a high tendency to stick to all contact surfaces, it may be advantageous to coat the rollers used for the production of the composites as well as the stripping rollers with a material that is anti-adhesive with respect to the copolymers, for example with polytetrafluoroethylene. In this way appropriate strip tensions for the satisfactory coiling of the composite materials can, for example, be maintained.

The films coated with adhesive polymer composites containing at least one, preferably hydrogenated, nitrile rubber polymer having a Mooney viscosity (ML 1+4@ 100° C.) below 30 that are obtained in this way can advantageously be used in the coating of glass, wood, ceramics, production of floor coverings or all types of lacquered articles, such as metal, alloys, as well as plastics such as polycarbonate, polyamide, polyester and ABS. Generally such applications are those in which high quality surfaces have to be protected for a certain time.

The present invention provides an adhesive composition containing the adhesive polymer composites containing at least one, preferably hydrogenated, nitrile rubber polymer having a Mooney viscosity (ML 1+4 @ 100° C.) below 30, such as a hot-melt system.

The present invention also provides a sealant composition containing the adhesive polymer composites containing at least one, preferably hydrogenated, nitrile rubber polymer having a Mooney viscosity (ML 1+4 @ 100° C.) below 30, such as a hot-melt system.

The hot melt system is preferably a 100% solids system, where the composition is usually provided in small particles, such as pellets or another shaped article, such as a stick. The shaped article is heated to the softening temperature, preferably 200-215° C., by a suitable means and applied on or between the materials to seal or glue. It might be advantageous to cover the shaped articles with a powdering substance such as a polyolefin powder in order to reduce the tackiness of the shaped article and to ensure that the articles won't stick together after transport to the customer.

Self-supporting shaped articles, such as tapes are especially useful in architectural work and for insulating glass sealing. Hot melt systems containing the present inventive compound are especially useful as insulation sealants for glass windows and doors. Further areas of application include: automotive industry, especially applications under the hood and/or at higher ambient temperatures, building/construction, bridges, roads, transport, woodworking and wood bonding, bookbinding, graphic industry, packaging industry, disposable articles, laminates, shoe manufacture, end customer adhesive applications, and in the sealant and insulating industry.

The compound of the present invention is permanently tacky, remains flexible, and is especially recommended for applications at elevated temperatures.

EXAMPLES

Example 1

Ruthenium, [1,3-bis-(2,4,6-trimethylphenyl)-2-imidazolidiniylidene] dichloro(phenylmethylene)( )tricycki-hezylphosphine) (Grubb's $2^{nd}$ generation metathesis catalyst), Ethylene and monochlorobenzene (MCB) were purchased from Materia, Praxair, and PPG respectively and used as received. Perbunan was obtained from Bayer Inc.

The metathesis reactions were carried out in a laboratory reactor under the following conditions:

| | |
|---|---|
| Cement Concentration | 15% |
| Co-Olefin | Ethylene |
| Co-Olefin Concentration | 500 psi |
| Agitator Speed | 600 rpm |
| Reactor Temperature | 80° C. |
| Catalyst Loading | 0.05 phr |
| Solvent | Monochlorobenzene |
| Substrate | statistical Butadiene-acrylonitrilecopolymer with a acrylonitrile content of 33 wt %, a content of methacrylic acid of 5 wt % and a Mooney-Viscosity ML (1 + 4)@ 100 deg. C. of 30. |

The polymer (490 g) was dissolved in monochlorobenzene (2.8 kg). The reactor was heated to desired temperature and 40 mL of a monochlorobenzene solution containing Grubb's catalyst was added to the reactor. The reactor was pressurized with ethylene to a pressure of 500 psi. The temperature was maintained constant for the duration of the reaction. A cooling coil connected to a temperature controller and a thermal sensor was used to regulate the temperature.

The hydrogenation reactions were carried out in the same reactor as the metathesis under the following conditions:

| | |
|---|---|
| Cement solid concentration | 15% |
| $H_2$(g) pressure | 1200 psi |
| Agitator Speed | 600 rpm |
| Reactor Temperature | 138° C. |
| Catalyst Loading (Wilkinson's) | 0.075 phr |
| Triphenylphosphine | 1 phr |
| Solvent | Monochlorobenzene |

The cement from the metathesis reaction was degassed 3 times with $H_2$ (100 psi) under full agitation. The temperature of the reactor was raised to 130° C. and a 40 mL monochlorobenzene solution containing Wilkinson's catalyst and triphenylphosphine was added to the reactor. The temperature was allowed to increase to 138° C. and maintained constant for the duration of the reaction. The hydrogenation reaction was monitored by measuring the residual double bond (RDB) level at various intervals using IR spectroscopy.

Alternatively, the Ruthenium metathesis catalyst could be used to hydrogenate the polymer.

Examples 2-3

Compounding and Physical Testing

Polymer composites were mixed on an open mill. The curatives were added on a cold open mill in a separate mixing step. The formulations used in this assessment are based on a simplified peroxide recipe according to Table 1.

Carbon black N 660 Sterling-V available from Cabot Tire Blacks

Maglite® D is a MgO available from C.P. Hall.

Naugard® 445 is a diphenylamine available from Uniroyal Chemical.

Plasthall TOTM is a Trioctyl trimellitate available from C.P. Hall.

Vulkanox® ZMB-2/C5 is a Zinc salt of 4- and 5-methyl-mercapto benzimidazole available from Bayer AG DIAK #7 is a Triallylisocyanurate available from DuPont Dow Elastomers Vulcup 40KE is 2,2'-bis(tert-butylperoxy di-isopropylbenzene) available from Harwick Standard.

TABLE 1

Compounding Recipe

| | Example | |
|---|---|---|
| | 2 (comp.) | 3 |
| Therban ® A3407 | 100 | |
| HNBR of Example 1 | | 100 |
| Carbon Black, N 326 | 30 | 30 |
| Maglite ® D | 2 | |
| Naugard ® 445 | 1 | 1 |
| Plasthall TOTM | 5 | |
| Vulkanox ® ZMB-2/C5 (ZMMBI) | 0.5 | |
| Zinc Oxide (Kadox ® 920) Grade PC 216 | 3 | |
| Curatives | | |
| Spider Sulfur | 0.3 | 0.3 |
| Struktol ZP 1014 | | 7 |
| DIAK #7 | 1.5 | 1.5 |
| Vulcup 40KE | 7.5 | 7.5 |

Polymer Properties

A summary of the raw polymer properties is shown in Table 2. The molecular weight (Mw) of the Polymer of Example 1 is ¼ that of regular Therban® A3407 while the narrow polydispersity (PDI) is 2.0 compared to 3.2 for the regular grade.

TABLE 2

Summary of Raw Polymer Properties

| | Mn | Mw | PDI | ML 1 + 4 @ 100° C. |
|---|---|---|---|---|
| Polymer from Exp. 1 | 25000 | 50700 | 2.0 | 1.5 |
| Therban ® A3407 | 97000 | 314000 | 3.2 | 70.5 |

Polymer Composites Properties

Table 3 shows a summary of the properties of polymer composites of Exp. 2-3. Example 2 is for comparison.

TABLE 3

Summary of Polymer Composites Properties

| | Example | |
|---|---|---|
| | 2 | 3 |
| Tack to self (uncured) | 98 | >100[a] |
| Stickiness to Steel (uncured) | 8 | 29 |
| Adhesion To Brass (Nm) | None | 112 |

[a]Samples did not come apart

The tack was measured using a 90° pull on uncured rubber against itself and steel. As seen in Table 3 the rubber to rubber binding for Example 3 was stronger than the internal cohesive strength of the uncured specimen. The stickiness to steel is 3.5 times better than that of the comparative example.

The adhesion to Brass was measured on an Instron 4501 instrument ID. This method tests the force required to delaminate the test vulcanized test specimen. From Table 3, it is clear that example 3 has significantly improved adhesion to brass. Together with the high flowability of this new product make ideal for adhesive applications.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A self-supporting shaped article comprising an adhesive polymer composite which comprises at least one hydrogenated nitrile polymer derived from at least one conjugated diene, at least one alpha, beta-unsaturated nitrile and one or more unsaturated mono- or dicarboxylic acids or derivative thereof, the polymer having a Mooney viscosity (ML 1+4 @ 100° C.) less than 10, wherein the adhesive polymer composite is layered on or interposed between one or more supporting means, and wherein the self-supporting shaped article is in the form of a tape.

2. The self-supporting shaped article according to claim 1, wherein the article further comprises at least one supporting means on which the adhesive polymer composite is layered.

3. The self-supporting shaped article according to claim 1, wherein the adhesive polymer composite further comprises at least one filler.

4. The self-supporting shaped article according to claim 1, wherein the adhesive polymer composite further comprises at least one cross-linking agent.

5. The self-supporting shaped article according to claim 1, wherein the nitrile rubber polymer is hydrogenated and comprises more than 50 percent residual double bound hydrogenation.

6. The self-supporting shaped article according to claim 5, wherein the hydrogenated nitrile rubber polymer comprises more than 90 percent residual double bound hydrogenation.

7. The self-supporting shaped article according to claim 6, wherein the hydrogenated nitrile rubber polymer comprises more than 99 percent residual double bound hydrogenation.

* * * * *